United States Patent
Kissinger et al.

(10) Patent No.: US 11,236,995 B2
(45) Date of Patent: Feb. 1, 2022

(54) OPTICAL SHAPE SENSING METHOD AND SYSTEM

(71) Applicant: Cranfield University, Cranfield (GB)

(72) Inventors: Thomas Kissinger, Cranfield (GB); Ralph Peter Tatam, Cranfield (GB)

(73) Assignee: Cranfield University, Cranfield (GB)

( * ) Notice: Subject to any disclaimer, the term of this patent is extended or adjusted under 35 U.S.C. 154(b) by 0 days.

(21) Appl. No.: 16/977,272

(22) PCT Filed: Feb. 11, 2019

(86) PCT No.: PCT/GB2019/050353
§ 371 (c)(1),
(2) Date: Sep. 1, 2020

(87) PCT Pub. No.: WO2019/166765
PCT Pub. Date: Sep. 6, 2019

(65) Prior Publication Data
US 2021/0003392 A1    Jan. 7, 2021

(30) Foreign Application Priority Data
Mar. 2, 2018    (GB) .................................... 1803428

(51) Int. Cl.
*G01B 9/02* (2006.01)
*G01B 11/24* (2006.01)

(52) U.S. Cl.
CPC ................ *G01B 11/2441* (2013.01)

(58) Field of Classification Search
CPC ............. G01B 11/2441; G01B 11/161; G01D 5/35316; G01D 5/35383; G01L 1/246
See application file for complete search history.

(56) References Cited

U.S. PATENT DOCUMENTS

| | | | |
|---|---|---|---|
| 6,449,046 B1* | 9/2002 | Huang ............... | G01D 5/35303 356/478 |
| 2004/0206892 A1* | 10/2004 | Martinez ............ | G01D 5/35383 250/227.14 |

(Continued)

FOREIGN PATENT DOCUMENTS

| CN | 105783781 A | 7/2016 |
|---|---|---|
| EP | 1890105 A1 | 2/2008 |

(Continued)

OTHER PUBLICATIONS

Q. Liu et al., "Ultrahigh Resolution Multiplexed Fiber Bragg Grating Sensor for Crustal Strain Monitoring," in IEEE Photonics Journal , vol. 4, No. 3, pp. 996-1003, Jun. 2012, doi: 10.1109/JPHOT.2012.2201217. (Year: 2012).*

(Continued)

*Primary Examiner* — Tarifur R Chowdhury
*Assistant Examiner* — Jonathon Cook
(74) *Attorney, Agent, or Firm* — MacMillan, Sobanski & Todd, LLC (57) ABSTRACT

An optical shape sensing method is provided. The method comprises: providing first and second optical fibre portions arranged to receive light from at least one common lasers such that a path length of the light from the laser to the first optical fibre portion differs from a path length of the light from the lasers to the second optical fibre portion by a first distance; wherein the first and second optical fibre portions are spaced apart from each other in a first direction; and wherein the first and second optical fibre portions comprise a plurality of reflectors spaced along the length of the optical fibre portions, wherein the reflectors are arranged in sets of reflectors, each set including one reflector from each of the optical fibre portions, wherein the reflectors in each set are aligned with one another in a second direction that is perpendicular to the first direction when the optical fibre (Continued)

portions are in neutral positions; supplying light from the laser to the optical fibre portions; detecting an interferometric signal from the optical fibre portions at a common detector; determining, for each set of reflectors, optical path length differences between the reflectors in the set of reflectors based on the detected interferometric signal; determining a curvature of the optical fibre portions in the first direction based on the optical path length differences, between the reflectors in the first and second optical fibre portions, for the sets of reflectors. An optical shape sensor and optical shape sensing system are also provided.

16 Claims, 6 Drawing Sheets

(56) References Cited

U.S. PATENT DOCUMENTS

| | | | | |
|---|---|---|---|---|
| 2007/0286561 | A1* | 12/2007 | Poland | G01D 5/35383 385/126 |
| 2014/0061452 | A1* | 3/2014 | Schade | G01M 11/083 250/227.14 |
| 2014/0063493 | A1* | 3/2014 | Nash | G01J 1/44 356/226 |
| 2015/0285683 | A1* | 10/2015 | Ouellette | G01D 5/35383 356/451 |
| 2017/0052091 | A1 | 2/2017 | Mori | |
| 2017/0219390 | A1* | 8/2017 | Morimoto | G01D 5/35316 |

FOREIGN PATENT DOCUMENTS

| | | |
|---|---|---|
| WO | 2011034584 A2 | 3/2011 |
| WO | 2016161245 A1 | 10/2016 |

OTHER PUBLICATIONS

Kissinger et al., "Dynamic Fiber-Optic Shape Sensing Using Fiber Segment Interferometry", Journal of Lightwave Technology, 2018, vol. 36, No. 4, pp. 917-925.

Patents Act 1977: Search Report under Section 17(5), Application No. GB180348.0, dated Aug. 31, 2018.

PCT Search Report and Written Opinion, Application No. PCT/GB2019/050353, dated Apr. 18, 2019.

\* cited by examiner

OPTICAL SHAPE SENSING METHOD AND SYSTEM

TECHNICAL FIELD

The present disclosure relates to an optical shape sensing method and system.

BACKGROUND

Figure 1:
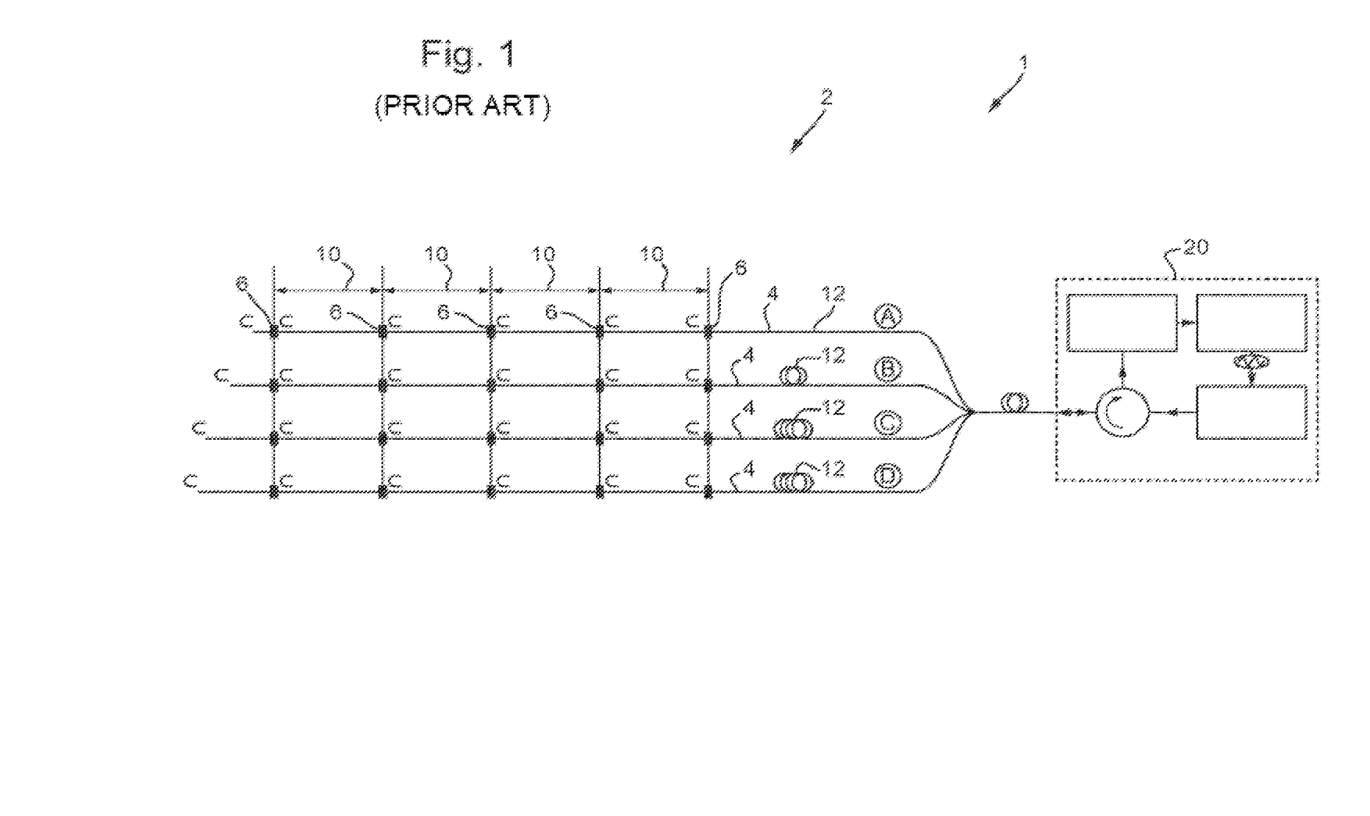
FIG. 1 is a schematic view of a previously proposed optical shape sensing system.

With reference to FIG. 1, a previously proposed optical shape sensing system 1 comprises an optical fibre curvature sensor 2 and an interrogation unit 20 configured to provide laser light to the optical fibre curvature sensor 2 and receive an interferometric signal produced by the optical fibre curvature sensor 2.

The optical shape sensing system 1 utilises the differences in strain measurements over a length of two or more optical fibres 4 of the sensor 2 to determine a change in curvature of the optical fibres 4.

In the arrangement depicted, a plurality of reflectors 6 are equally spaced along the length of each optical fibre 4, splitting the optical fibres in a plurality of portions 10 of equal length. In use, the optical fibres 4 are arranged such that the optical fibres 4 are separated from one another by predetermined distances in two or more lateral directions of the optical fibre 4 and the portions 10 of each optical fibre are axially aligned between the optical fibres 4, e.g. when the optical fibres are in a neutral, undeformed condition.

Strains of each of the portions 10 of the optical fibres 4 between each adjacent pairs of reflectors 6 can determined using interferometric measurement techniques. A Range Resolved Interferometry (RRI) technique, described in more detail below, may be used to determine the strain of each portion 10 of the optical fibre 4. In particular, the strain of each portion 10 of the optical fibres may be determined by detecting changes in the Optical Path length Differences (OPDs) of interferences between light reflecting from the end of the optical fibre 4, e.g. the fibre tip or an end reflector, and each of the reflectors 6, as the curvature of the optical fibre changes. The difference between the strains in axially aligned portions of two or more of the optical fibres 4 are then used to determine the change in curvature of the optical fibres 4, e.g. in a corresponding lateral direction.

In order to enable the strains of the portions 10 of each optical fibre 4 to be determined separately, each optical fibre may comprise a delay length 12 of optical fibre to prevent interferences of light reflecting from the ends of the optical fibres 4 and reflectors 6 in others of the optical fibres occurring with the same or similar OPDs as interferences of light reflecting from the end of the optical fibres and reflectors provided within the same optical fibre.

In order to achieve this, the delay length 12 of each subsequent optical fibre is equal to or greater than the length of the preceding optical fibre. Although the large delay lengths 12 prevent interferences between the optical fibres, configuring the system 1 to operate with the large delay lengths can lead to high measurement noise.

Additionally, since it is necessary to determine the total strain of each optical fibre 4, in order to determine the difference in strains between the optical fibres 4, longitudinal strain of the entire optical fibre curvature sensor 2, e.g. not corresponding to curvature of the sensor, is also captured by the strain measurements. In some applications, the overall longitudinal strain of the sensor 2 may be significant compared to the change in curvature, and hence, a larger measurement bandwidth is required than would be necessary to capture only strains caused by changes in curvature of the optical fibres 4.

STATEMENTS OF INVENTION

According to an aspect of the present disclosure, there is provided an optical shape sensing method comprising: providing first and second optical fibre portions arranged to receive light from at least one common lasers such that a path length of the light from the laser to the first optical fibre portion differs from a path length of the light from the lasers to the second optical fibre portion by a first distance; wherein the first and second optical fibre portions are spaced apart from each other in a first direction; and wherein the first and second optical fibre portions comprise a plurality of reflectors spaced along the length of the optical fibre portions, wherein the reflectors are arranged in sets of reflectors, each set including one reflector from each of the optical fibre portions, wherein the reflectors in each set are aligned with one another in a second direction that is perpendicular to the first direction when the optical fibre portions are in neutral positions, e.g. in which the optical fibre portions are straight and/or substantially unstressed; supplying light from the laser to the optical fibre portions; detecting an interferometric signal from the optical fibre portions at a common detector; determining, for each set of reflectors, optical path length differences between the reflectors in the set of reflectors based on the detected interferometric signal; determining a curvature of the optical fibre portions in the first direction, e.g. about an axis perpendicular to the first and second directions, based on the optical path length differences, between the reflectors in the first and second optical fibre portions, for the sets of reflectors e.g. based on a variation in the optical path length differences between the sets. In other words, for each set of reflectors, optical path length differences are determined between the reflectors in the first and second optical fibre portions. The variation in these optical path length differences between the different sets of reflectors indicates the curvature of the optical fibre portions.

The reflectors may be spaced apart along the optical fibre portions by an offset distance. The offset distance may be greater than the first distance.

The first and second optical fibre portions may be arranged parallel to one another and the first direction may be perpendicular to the direction in which the first and second optical fibre portions extend, e.g. main longitudinal axes of the optical fibre portions. The second direction may be parallel to the longitudinal axes of the optical fibre portions.

The distance, e.g. traveled by the light, between the reflectors in each of the optical fibre portions may be the same. For example, the distance between each of the reflectors in one set and the reflectors in an adjacent set may be the same for each of the optical fibre portions.

The method may comprise providing a third optical fibre portion arranged to receive light from the at least one common laser. The third optical fibre portion may be arranged such that a path length of the light from the laser to the third optical fibre portion differs from the path length of the light from the laser to the first optical fibre portion by a second distance.

The third optical fibre portion may be spaced apart from the first optical fibre portion in a third direction. The third direction may have a component perpendicular to the first and second directions. The third optical fibre portion may comprise a plurality of reflectors spaced along the third optical fibre portion. The reflectors of the third optical fibre portion may be provided within the sets of reflectors such that the reflectors in each set are aligned in the second direction when the fibres are in a neutral position.

The method may further comprise determining a curvature of the optical fibre portions in the third direction, e.g. about an axis in the first direction, based on the optical path length differences, between the reflectors in the first and third optical fibre portions, for the sets of reflectors.

The reflectors may be spaced apart along the third optical fibre portion by the offset distance or a further offset distance. The second distance may be less than the offset distance and further offset distance. The further offset distance may be greater than the first distance.

The third optical fibre portion may be spaced apart from the first optical fibre portion in the first direction or in a direction perpendicular to the first and second directions.

The second distance may be different from the first distance, such that optical path differences between reflectors in the first and second optical fibre portions and reflectors in the first and third optical fibre portions can be distinguished, e.g. within the same set of reflectors.

The method may further comprise determining the curvature of the optical fibre portions in the first and/or third directions based on the optical path length differences, between the reflectors in the second and third optical fibre portions, for the sets of reflectors.

The method may further comprise modulating the light from the at least one laser using an optical frequency modulation technique. The optical path length differences may be determined by applying a range-resolved interferometry technique, e.g. such that the frequencies of components of the interferometric signal correspond to the optical path length differences.

The method may further comprise applying a signal multiplexing technique, such as time-pulse multiplexing or code division multiplexing, to the light from the at least one laser, such that portions of the interferometric signal corresponding to the different sets of reflectors can be distinguished from one another based on a propagation time of the light.

A time period of the multiplexed signal may be selected such that light sent during the time period is reflected by each of the reflectors in each respective set of reflectors and is received at the detector at substantially the same time.

Additionally, the time period of the multiplexed signal may be selected such that light sent during the time period, and reflected by reflectors in more than one set of reflectors, does not reach the detector at the same time.

In this way, the reflections from the difference reflector sets may be distinguished based on the time or delay at which reflections of the light sent during a particular time period are received at the detector. When the signal multiplexing technique is time pulse modulation, the time period may correspond to the length of a light pulse. When the signal multiplexing technique is code division multiplexing, the time period may correspond to a length of a portion of the code, e.g. a chip length.

The time period may be selected such that light sent during the time period and reflected by reflectors in the a first set of reflectors does not interfere with light reflected by reflectors in a second set of reflectors.

Two or more common lasers may be provided. The method may comprise multiplexing the light provided by the lasers, e.g. using a signal multiplexing technique, such as code division multiplexing, time division multiplexing or any other suitable multiplexing technique, such that light from the lasers can be distinguished from one another within the interferometric signals. The method may further comprise determining the optical path length differences using a multi-wavelength interferometry technique. In this way, the unambiguous measurement range of the interferometer may be increased. In particular, the unambiguous range may be increased to a working range of the sensing method, such that a curvature of the optical fibre portions can be reliably determined without knowledge of the initial state, e.g. curvature, of the optical fibre portions.

The optical fibre portions may comprise individual optical fibres. Alternatively, the optical fibre portions may comprise cores provided within a multi-core optical fibre.

According to another aspect of the present disclosure, there is provided an optical shape sensor comprising: first and second optical fibre portions arranged to receive light from at least one common laser, e.g. via an optical coupler arranged between the laser and the first and second optical fibre portions; wherein the first and second optical fibre portions are arranged such that a path length of the light from the laser to the first optical fibre portion differs from a path length of the light from the laser to the second optical fibre portion by a first distance; wherein the first and second optical fibre portions are spaced apart from each other in a first direction; and wherein the first and second optical fibre portions each comprise a plurality of reflectors spaced along the length of the optical fibre portions, wherein the reflectors are arranged in sets of reflectors, each set including one reflector from each of the optical fibre portions, wherein the reflectors in each set are aligned with one another in a second direction that is perpendicular to the first direction when the optical fibre portions are in a neutral position.

The reflectors may be spaced apart along the optical fibres by a distance greater than the first length.

The sensor may further comprise a third optical fibre portion arranged to receive light from the at least one common laser. The third optical fibre portion may be arranged such that a path length of the light from the laser to the third optical fibre portion differs from the path length of the light from the laser to the first optical fibre portion by a second distance.

The third optical fibre portion may be spaced apart from the first optical fibre portion in a third direction that has a component perpendicular to the first and second directions. The third optical fibre portion may comprise a plurality of reflectors spaced along the third optical fibre portion. The reflectors of the third optical fibre portion may be provided within the sets of reflectors such that the reflectors in each set are aligned in the second direction when the fibres are in a neutral position.

The reflectors may be spaced apart along the optical fibres by a distance that is greater than the first distance and the second distance.

An optical shape sensing system may comprise the above mention optical shape sensor and at least one laser configured to provide light to the optical shape sensor.

The optical shape sensing system may further comprise an optical fibre configured to carry the light from the laser to the optical shape sensor.

An optical coupler may be provided to optically couple the lasers to the optical fibre. The optical shape sensing system may comprise a plurality of optical fibres configured to carry light from the lasers to each of the optical fibre portions of the shape sensor, e.g. one optical fibre for each optical fibre portion.

The optical shape sensing system may further comprise an interferometric detector arranged to receive an interferometric signal from the optical fibre portions, e.g. an interferometric detector common to each of optical fibre portions.

The optical shape sensing system may further comprise an optical fibre configured to carry the light from the optical shape sensor to the interferometric detector.

The optical fibre may be common to each of the optical fibre portions. An optical coupler may be provided to optically couple the optical fibre portions of the optical shape sensor to the optical fibre. Light may be carried from the laser to the optical fibre portions by the same optical fibre that carries the light from the optical fibre portions to the interferometric detector.

The optical shape sensing system may further comprise a first optical coupler configured to optically couple the laser and the interferometric detector to a first end of the optical fibre and a second optical coupler configured to optically couple the optical fibre portions to a second end of the optical fibre. Light may travel di-directionally within the optical fibre between the lasers, the optical fibre portions and the interferometric detector.

The optical shape sensing system may further comprise a controller comprising one or more modules configured to operate the laser to supply light to the optical fibre portions.

The controller may further comprise one or more modules configured to determine, for the sets of reflectors, optical path length differences between the reflectors in the set of reflectors based on a detected interferometric signal from the optical shape sensor.

The controller may further comprise one or more modules configured to determine a curvature of the optical fibre portions, e.g. in the first and/or third directions, based on the optical path length differences, between the reflectors, in each set of reflectors. Alternatively, the system may comprise a further controller configured to determine a curvature of the optical fibre portions.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION

Figure 2:
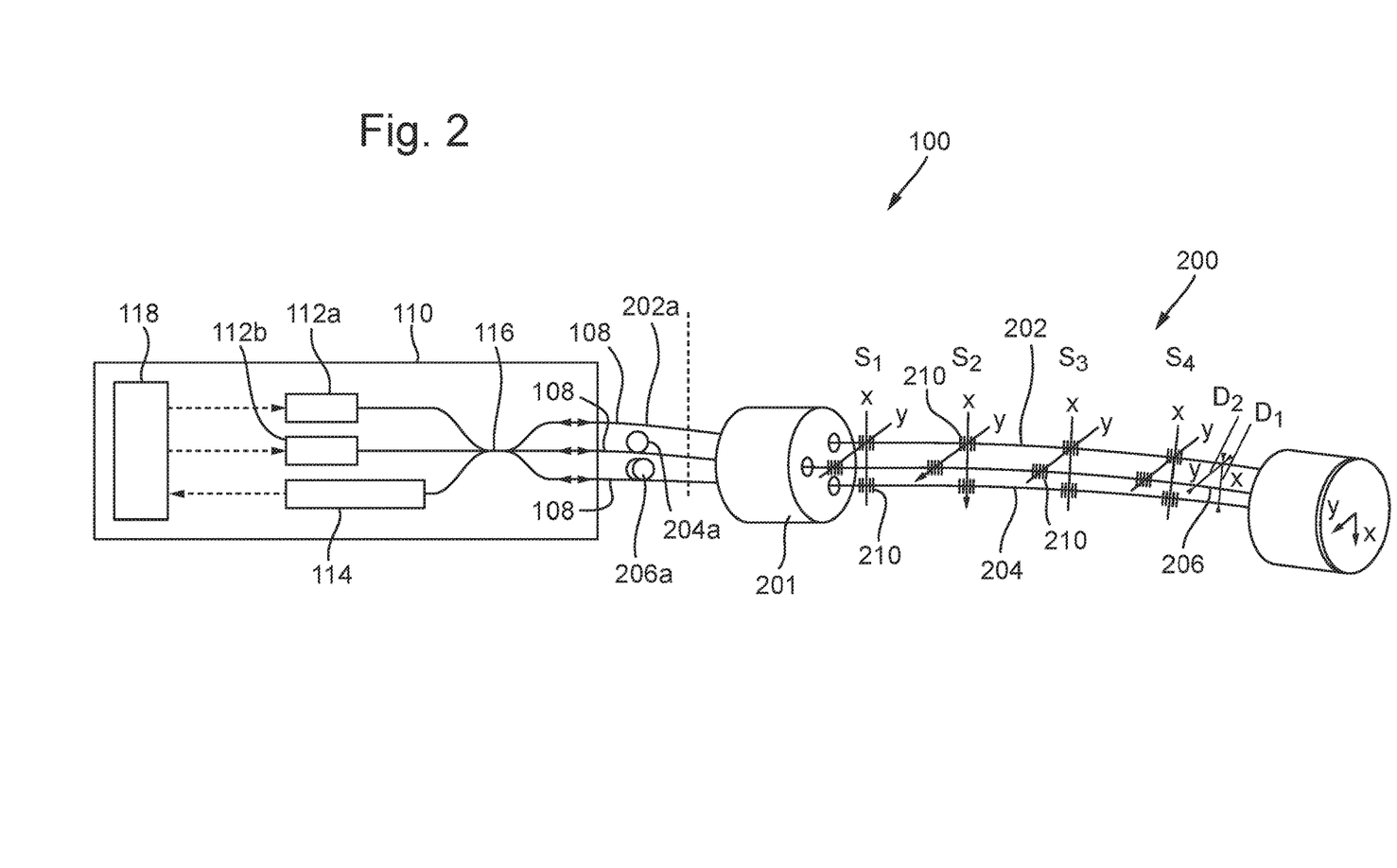
FIG. 2 is a schematic view of an optical shape sensing system according to arrangements of the present disclosure.

With reference to FIG. 2, an optical shape sensing system 100 according to arrangements of the present disclosure comprises an interrogation unit 110, and a fibre optic curvature sensor 200.

The interrogation unit 110 comprises first and second lasers 112a, 112b arranged to provide laser light to the fibre optic curvature sensor 200. The curvature sensor 200 is an interferometric sensing device configured to cause reflections of light from the laser to interfere with one another to produce an interferometric signal.

Optical fibres 108 extend between the interrogation unit 110 and the fibre optic curvature sensor 200 to carry light from the lasers 112a, 112b to the curvature sensor 200. The optical fibres 108 are also configured to carry the interferometric signal from the fibre optic curvature sensor 200 back to the interrogation unit 110.

The interrogation unit 110 further comprises a detector 114 arranged to receive the interferometric signal from the fibre optic curvature sensor 200. The detector 114 may comprises a photo detector, or any other sensor capable of detecting the interferometric signal.

The interrogation unit 110 further comprises a controller 118 configured to process the interferometric signal received by the detector 114 to determine the curvature being sensed by the fibre optic curvature sensor 200. In the arrangement depicted in FIG. 2, the controller 118, e.g. a further module of the controller 118, is configured to control the operation of the lasers 112a, 112b. For example, the controller 118 may be configured to modulate the frequency of light provided by the lasers 112a, 112b and apply a signal multiplexing technique to the laser light, as described below. Alternatively, the interrogation unit 110 may comprise a further controller (not shown) configured to control the operation of the lasers 112a, 112b.

In the arrangement shown, the curvature sensor 200 comprises first, second and third optical fibre portions 202, 204, 206. The optical fibre portions 202, 204, 206 are cores provided within a multi-core fibre optic cable 201. However, in other arrangements, the first, second and third optical fibre portions 202, 204, 206 may be provided as separate optical fibres.

As depicted, the interrogation unit 110 comprises a 3×3 optical coupler 116 configured to optically couple the first and second lasers 112a, 122b and the detector 114 to the optical fibres 108. However, other arrangements of optical couplers are also envisaged. For example, the interrogation unit 110 may comprise a 3×1 optical coupler configured to optically couple the first and second lasers and the detector to an optical fibre extending between the interrogation unit and the curvature sensor 200, and a 1×3 optical coupler may be provided, e.g. as part of the curvature sensor 200, to optically couple the optical fibre to the first, second and third optical fibre portions 202, 204, 206.

In further alternative arrangements, the optical shape sensing system 100 may comprise any other arrangement for optically coupling the laser 112a, 112b and the detector 114 to the fibre optic curvature sensor 200 such that laser light can be sent to the fibre optic curvature sensor 200 by the lasers 112a, 112b and received from the fibre optic curvature sensor 200 by the detector 114. For example, the interrogation unit 110 may comprise an optical circulator configured to direct the interferometric signal received from the fibre optic curvature sensor 200 to the detector 114.

The second optical fibre portion 204, is spaced apart from the first optical fibre portion 202 in a first direction X by a first predetermined distance D1. The optical fibre portions, e.g. main longitudinal axes of the optical fibre portions, extend in a second direction Z. The first direction X is substantially perpendicular to the second direction Z. In other words, the first direction X is a lateral direction of the optical fibre portions 202, 204, 206.

The third optical fibre portion 206, is spaced apart from the first optical fibre portion 202 in a third direction Y by a second predetermined distance D2. The second predetermined distance D2 may be the same as the first predetermined distance D1.

Alternatively, the first and second predetermined distances D1, D2 may differ. As depicted, the third direction Y is a lateral direction of the optical fibre portions, e.g. substantially perpendicular to the second direction Z, and is substantially perpendicular to the first direction X. In other arrangements, the third direction Y may be parallel with the first direction X or comprise components parallel and perpendicular to the first direction X.

In use of the fibre optic curvature sensor 200, the first, second and third optical fibre portions 202, 204, 206 are supported, e.g. relative to one another, such that the separations between the first and second and first and third optical fibre portions are maintained as the curvature of the sensor 200 changes.

The first, second and third optical fibre portions 202, 204, 206 each comprise a plurality of reflectors 210 spaced along the lengths of the optical fibre portions. The reflectors may be spaced apart by a spacing distance. The reflectors 210 are configured to reflect a portion of the laser light travelling along the optical fibre portion. The reflectors 210 may comprise Bragg gratings, fibre voids, elements of reflective material embedded in the optical fibre portions or any other suitable form of reflector.

The reflectors 210 are arranged into sets of reflectors S1, S2, S3, S4, each set of reflectors including a reflector 210 in each of the optical fibre portions 202, 204, 206. The reflectors 210 are spaced along the respective optical fibre portions such that, when the optical fibre portions are in neutral, e.g. uncurved, positions, the reflectors 210 in each of the sets of reflectors S1, S2, S3, S4 are aligned with one another in the second direction Z, e.g. along the axis of the optical fibre portions 202, 204, 206.

The first, second and third optical fibre portions 202, 204, 206 each comprise respective optical fibre portion delay lengths 202a, 204a, 206a, which comprise lengths of optical fibre that act as delays to the transmission of optical signals along the optical fibre portions 202, 204, 206. The optical fibre portion delay lengths are provided between the interrogation unit 110, e.g. the optical coupler 116, and the reflectors 210.

Each of the optical fibre portion delay lengths may be unique. The delay length of each of the optical fibre portions may be a multiple of a delay length portion. For example, the first optical fibre portion 202 may have a delay length equal to the delay length portion, the second optical fibre portion 204 may have a delay length of twice the delay length portion and the third optical fibre portion 206 may have a delay length of three times the delay length portion. Alternatively, as depicted in FIG. 2, the first optical fibre portion 202 may have a delay length of 0 (zero), the second optical fibre portion 204 may have a delay length equal to a delay length portion and the third optical fibre portion 206 may have a delay length of twice the delay length portion. Alternatively again, the delay lengths may differ by different amounts between the optical fibre portions.

The greatest difference in the delay lengths between any pair of the optical fibre portions 202, 204, 206 may be less than the spacing distance between the reflectors along the first, second and third optical fibre portions. This allows the interferences corresponding to reflections of laser light from each of the sets of reflectors S1, S2, S3, S4 to be distinguished from one another when operating the curvature sensor, as described below.

The fibre optic curvature sensor 200 forms a plurality of interferometers, each comprising a pair of arms. In particular, arms of the interferometers may be defined between the coupling 116 provided within the interrogation unit 110 and each of the reflectors 210 provided in each of the optical fibre portions 202, 204, 206. A portion of the light from the laser travels along each arm of the interferometers and interferes with the portions of the laser light travelling along each of the other arms to produce an interferometric signal comprising light from all of the interferometers. The interferometric signal is detected by the detector 114.

Due to the delay lengths being provided for each optical fibre portion, when the fibre optic curvature sensor is in a neutral, uncurved position, Optical Path length Differences (OPDs) between the reflectors 210 in each set of reflectors S1, S2, S3, S4 will be equal to the differences in the delay lengths between the corresponding optical fibre portions.

For example, considering the first set of reflectors S1 depicted in FIG. 2, the OPD of the interference between light reflecting from the reflector in the first optical fibre portion 202 and light reflecting from the reflector in the second optical fibre portion 204 will be equal to the delay length portion and the OPD of the interference between light reflecting from the reflector in the first optical fibre portion 202 and light reflecting from the reflector in the third optical fibre portion 208 will be equal to twice the delay length portion. If the fibre optic curvature sensor 200 remains uncurved along its length, the OPDs of interferences corresponding to reflectors in each of the other sets of reflectors will be the same as the first set S1.

When the curvature of the fibre optic curvature sensor 200 is changed, the optical fibre portions, e.g. of the first, second and third optical fibre portions 202, 204, 206, which are located closer to an outside of the curve than others of the optical fibre portions, will experience a greater positive strain, e.g. increase in length, than the other optical fibre portions. Similarly, the optical fibre portions, which are located closer to an inside of the curve than others of the optical fibre portions, will experience a greater negative strain, e.g. reduction in length, than the other optical fibre portions.

For example, if a portion of the curvature sensor is curved in the first direction such that the first optical fibre portion 202 is on the outside of the curve, the first optical fibre portion may experience a positive strain in the area of the curve and the second optical fibre portion may experience a negative strain. The distances between the coupler 116 and the reflectors 210 within the first optical fibre portion at, and further along the optical fibre portion than, the area of the curve are therefore increased compared to the distances between the coupler and the reflectors in corresponding sets of reflectors within the second optical fibre portion. The OPD of the interference between light reflecting from the reflectors in the first and second optical fibre portions, within each set of reflectors in and beyond the area of the curve, therefore varies, e.g. reduces, according to the magnitude of the curvature in the first direction X.

Since, in the arrangement depicted in FIG. 2, the third optical fibre portion 206 is aligned with the first optical fibre portion 202 in the first direction X, the OPD of interferences between the reflectors in the first and third optical fibre portions may be unchanged when the curvature sensor is curved in the first direction X, e.g. about an axis in the third direction Y. However, if the curvature sensor is curved in the third direction Y, the OPD of interferences between reflectors in the first and third optical fibre portions, within each set of reflectors in and beyond the area of the curve, will change according to the magnitude of the curvature in the third direction Y.

Hence, by determining the OPDs of interferences corresponding to reflectors in each set of reflectors individually, the magnitude, position and direction of curvature experienced by the fibre optic curvature sensor 200 can be determined.

Figure 3:
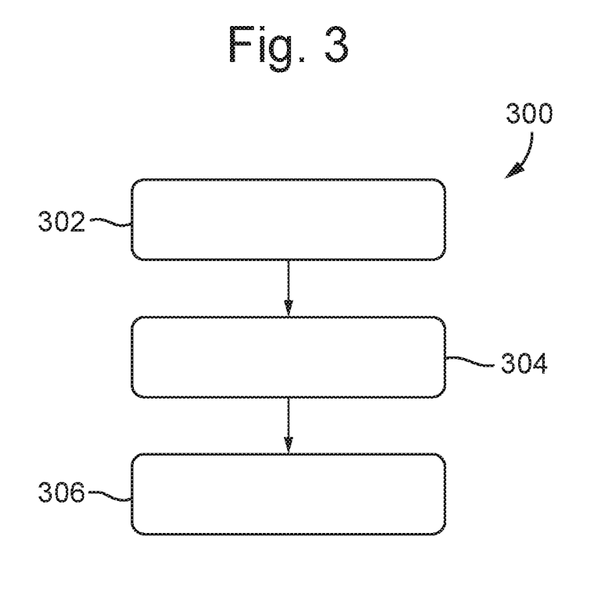
FIG. 3 is a flow diagram illustrating an optical shape sensing method according to arrangements of the present disclosure.

With reference to FIG. 3, in order to determine the curvature of the fibre optic curvature sensor 200 based on the interferometric signal received at the detector 114, the controller 118, or another controller, may perform an optical shape sensing method 300 according to arrangements of the present disclosure.

The method 300 comprises a first step 302, in which the fibre optic curvature sensor 200 is provided. As described above, the first, second and third optical fibre portions 202, 204, 206 of the curvature sensor may be arranged such that the optical fibre portions are spaced apart from one another in the first and third directions X, Y by the first and second predetermined distances D1, D2 respectively.

The method 300 further comprises a second step 304 in which OPDs between the reflectors in each set of reflectors S1, S2, S3, S4 are determined based on the detected interferometric signal.

In order to determine the OPDs, e.g. in the second step 304, the method 300 may comprise applying a Range-Resolved Interferometry (RRI) technique. RRI allows the different interferences of light within an interferometric signal to be distinguished from one another based on their OPD. RRI also allows the different OPDs of the interferences within an interferometric signal to be determined.

The RRI technique is performed by modulating the frequency of laser light produced by the lasers 112a, 112b. The frequency of the laser light may be modulated using a linear modulation function, such as a triangular or saw tooth modulation function. Alternatively, as depicted in the top frame of FIG. 4a, the frequency of the laser light may be modulated using a sinusoidal modulation function F1. Using a sinusoidal modulation function may reduce the complexity of the system due to a reduced number of frequency components within the modulation function.

Figure 4A:
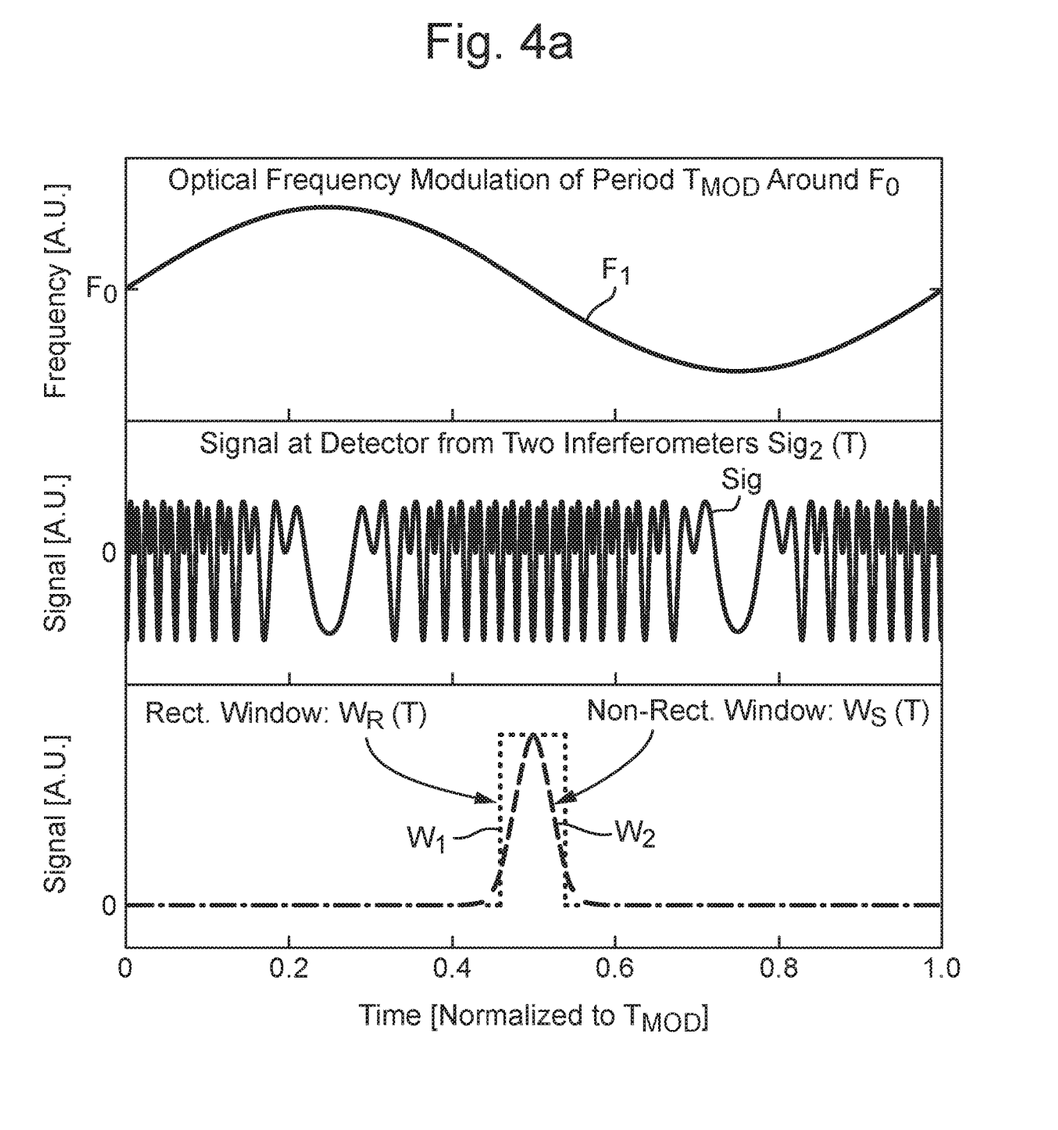
FIGS. 4a and 4b are graphs that are useful for understanding range resolved interferometry.

The middle frame of FIG. 4a depicts an example of an interferometric signal SIG received at a common detector from two interferometers that have been provided with laser light modulated using the modulation function F1. Each of the interferometers is configured to cause interference of the laser light over a different OPD.

The detected interferometric signal SIG may be multiplied by a window function. Two examples of windows functions W1 and W2 are shown in the bottom frame of FIG. 3a. The first window function W1 is a square function and the second window function W2 is a smooth window function, such as a Gaussian window function. It is also envisaged that other window functions may be used as desirable.

Figure 4B:
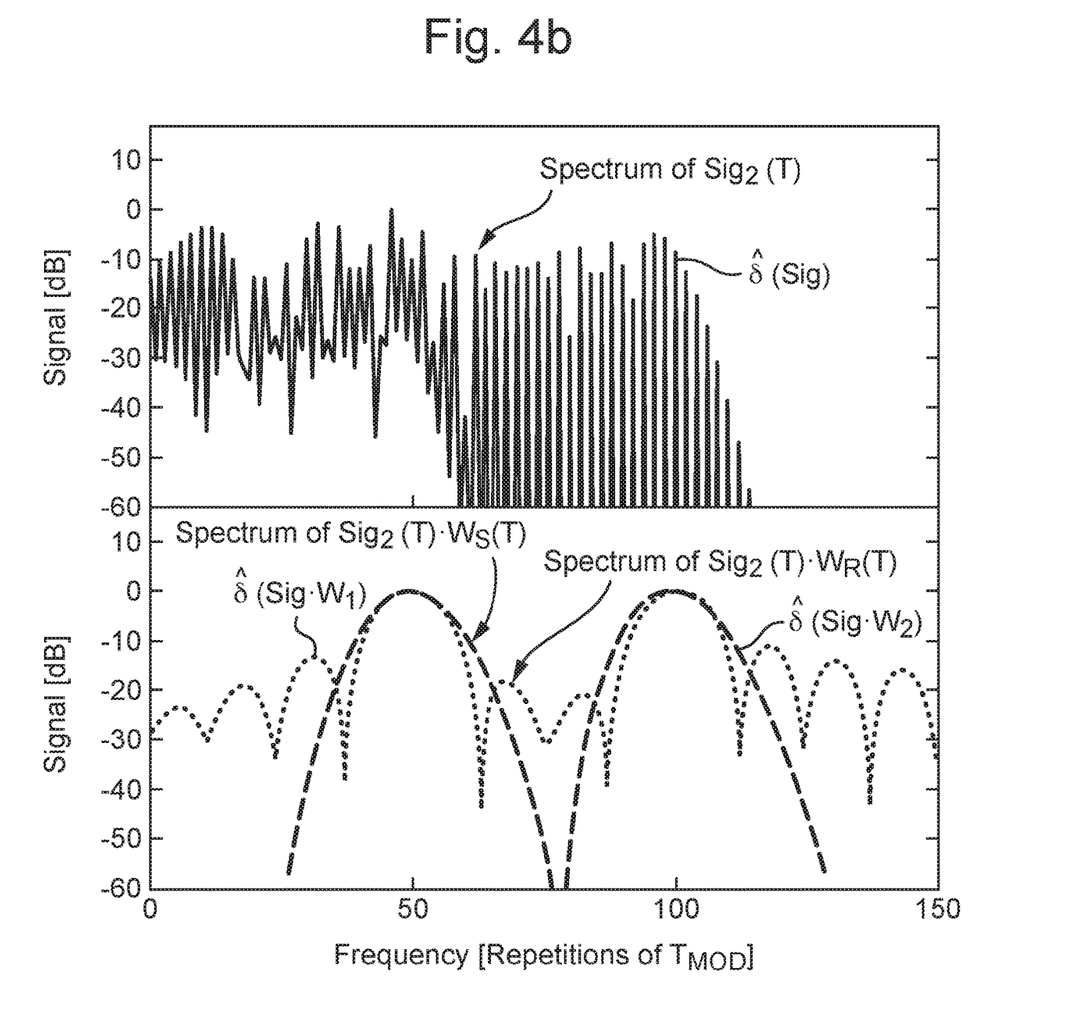

With reference to FIG. 4b, in order to determine the relative OPDs of the two interferometers, the detected interferometric signal is transformed into the frequency domain, e.g. by performing a Fourier transform ($f$) of the interferometric signal. Due to the modulation of the laser light sent to the interferometers, the positions of peaks in the frequency spectrum of the interferometric signal correspond to the OPDs of the interferometers.

The top frame of FIG. 4b shows a frequency spectrum $f$(SIG) of the interferometric signal and the bottom frame shows the Frequency spectrums $f$(SIG·W1) and $f$(SIG·W2) of the interferometric signals multiplied by the window functions W1 and W2 respectively. As shown, when the smooth window function W2 is applied to the interferometric signal, the peaks in corresponding Frequency spectrum may be more distinct from one another with less interference from side lobes. In the frequency spectrum $f$(SIG·W2), two peaks are present, the frequencies of the peaks corresponding to the OPDs of the two interferometers.

As described above, when the curvature sensor is in the neutral, uncurved position, the OPDs of interferences between light reflecting from the reflectors within each particular set of reflectors will be equal to the differences in the delay lengths of the optical fibre portions. The peaks within a frequency spectrum of the interferometric signal are therefore at the same frequencies and it may not be possible to distinguish between the sets of reflectors based on their OPDs.

Furthermore, if the curvature sensor is curved at an unknown position along the length of the optical fibre portions, such that OPDs of interferences corresponding to one or more of the sets of reflectors change, it may not be possible to determine which of the sets of reflectors is producing the interferences with different OPDs, and hence, it may not be possible to determine where, e.g. along its length, the curvature sensor 200 is experiencing a curvature.

As described above, the separation distance between the reflectors 210 along each of the optical fibre portions 202, 204, 206 may be greater than the largest delay length.

Hence, the interferences of reflections from two reflectors that are in different sets of reflectors may have a greater OPD than interferences corresponding to a particular set of reflectors. Interferences caused by reflectors in difference sets of reflectors can therefore be distinguished within the interferometric signal.

In order to distinguish between the portions of the interferometric signal relating to each set of reflectors, and thereby determine a curvature of the curvature sensor at a particular position along its length, a signal multiplexing technique may be used. The controller 118 or a further controller may be configured to apply the signal multiplexing technique to the light being provided by the lasers 112a, 112b. The signal multiplexing technique may be applied such that portions of the interferometric signal can be distinguished from one another based on a propagation time of the light within the signal.

In one arrangement, the controller 118 is configured to apply a time division multiplexing technique, in which the lasers 112a, 112b are configured to provide laser light in pulses of a predetermined time period. The frequency of light provided during the pulses is modulated, e.g. using frequency modulation, as described above, such that RRI techniques can be applied to the interferometric signal produced by interferences between reflections of the light pulse.

The predetermined time period may be selected to be sufficiently long that reflections, of laser light sent within a single pulse, from each of the reflectors within a set of reflectors are received by the detector 114 at substantially the same time, such that interferences between the reflections from each of the reflectors within the set of reflectors can be detected. Additionally, the predetermined time period may be selected to be sufficiently short that interferences between reflections, of the light sent within a particular pulse, from the reflectors within two or more sets of reflectors, do not occur at the same time. When time division multiplexing is used, the gap between pulses may be sufficient to allow the light to be reflected from each of the reflectors 210 along the optical fibre portions 202, 204, 205 and return to the detector 114 before the next pulse is generated. In this way, portions of the interferometric signal, received at the detector 114 that correspond to different sets of reflectors can be distinguished from one another based on the time at which they are received by the detector 114.

For example, FIGS. 5a, 5b, 5c and 5d depict simplified frequency spectrums of the interferometric signal being received from the optical curvature sensor 200 at times T1, T2, T3 and T4 respectively, with frequency increasing along the horizontal axis. At time T1, the detector is receiving reflections from the reflectors in set S1; at time T2, the detector is receiving reflections from the reflectors in set S2; at time T3, the detector is receiving reflections from the reflectors in set S3 and at time T4, the detector is receiving reflections from the reflectors in set S4.

Figure 5A:
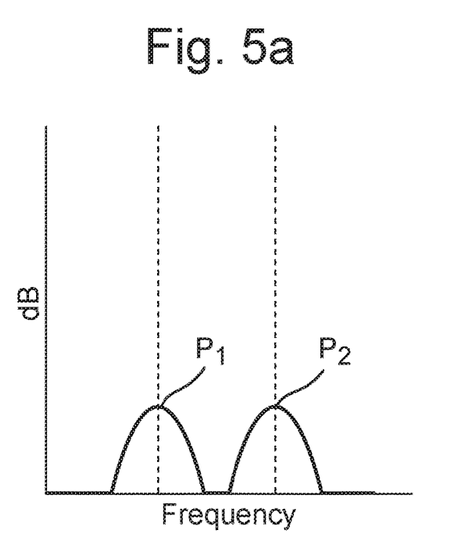
FIGS. 5a, 5b 5c and 5d are graphs showing examples of simplified frequency spectrums of an interferometric signal received by a detector of the optical shape sensing system depicted in FIG. 2 during different time periods.
Figure 5B:
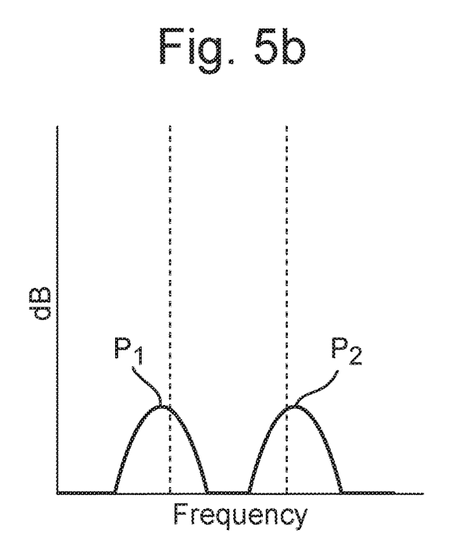

As depicted in FIGS. 5a and 5b, the positions of peaks within the frequency spectrums at times T1 and T2 are the same, indicating that there is no net curvature of the curvature sensor 200 between the reflectors in set S1 and set S2 along the optical fibre portions 202, 204, 206. The position of the lower frequency peak P1 corresponds to the difference in the delay lengths between the first and second optical fibre portions and the position of the higher frequency peak P2 corresponds to the difference in the delay lengths between the first and third optical fibre portions 202, 206.

Figure 5C:
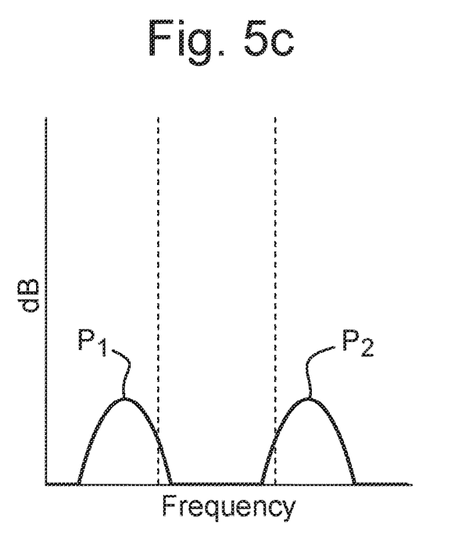

With reference to FIG. 5c, the positions of the peaks within the frequency spectrum at time T3 are however different, indicating that the curvature sensor 200 is measuring a curvature along the optical fibre portions 202, 204, 206 between the reflectors in sets S2 and S3. More particularly, the lower frequency peak P1 is at a reduced frequency (compared to at T1 and T2), indicating a reduction in the OPD between reflectors in the first and second optical fibre portions 202, 204 and therefore a curvature of the sensor 200 in the first direction X with the first optical fibre portion 202 being on the outside of the curve. The higher frequency peak is at an increased frequency, indicating an increase in the OPD between the first and third optical fibre portion and therefore a curvature of the sensor 200 in the third direction Y with the first optical fibre 202 portion being on the inside of the curve.

Figure 5D:
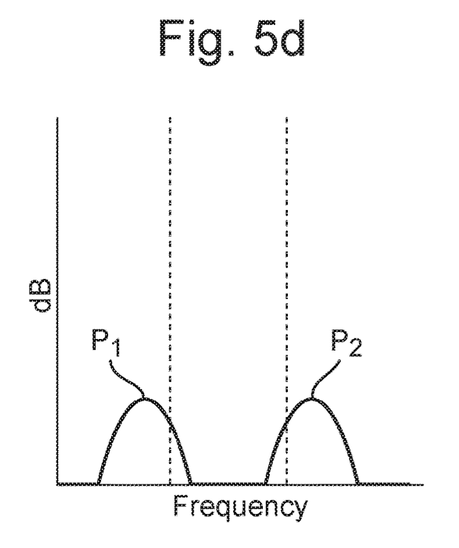

As shown in FIG. 5d, the positions of the peaks within the frequency spectrum at time T4 are the same as at time T3, indicating that there is no net curvature of the curvature sensor 200 between the reflectors in set S3 and set S4.

Returning to FIG. 3, the method 300 further comprises a third step 306, in which a curvature of the curvature sensor, e.g. the optical fibre portions provided within the curvature sensor, is determined based on the optical path length differences, between the reflectors.

The curvature of the curvature sensor 200 is determined in the third step 306 by considering the differences in the OPDs corresponding to each set of reflectors, e.g. by comparing the positions of peaks within frequency spectrums of the interferometric signals received at successive points in time.

The controller 118 is thereby able to determine a shape of the curvature sensor 200 from the magnitude and direction of curvature between each set of reflectors along the fibre optic curvature sensor 200. If the curvature sensor 200 is attached to an object, the curvature sensor 200 can therefore be used to determine a shape or change in shape of the object.

In the method 300 described above, time division multiplexing is used to enable the portions of the received interferometric signal corresponding to each of the sets of reflectors to be distinguished from one another based on a time at which the portion of the signal is received. However, in other arrangements alternative multiplexing techniques may be used. For example, a code-division multiplexing technique may be used. The code-division multiplexing technique may be applied using a repeating code the length of which corresponds to the predetermined time period. In this way, portions of the interferometric signal corresponding to each of the set of reflectors can be distinguished within the interferometric signal by demultiplexing the signal using an appropriate delay, e.g. corresponding to times T1, T2, T3 and T4.

Using a code division multiplexing technique allows light to be supplied constantly, without gaps between the time periods.

Alternatively again, any other signal multiplexing or signal processing technique may be used that enables portions of a received signal to be distinguished based on the propagation time of the signal portions.

In the arrangement depicted, the fibre optic curvature sensor 200 comprises three optical fibre portions 202, 204, 206. As described above, the second optical fibre portion 204 is spaced apart from the first optical fibre portion 202 in the first direction X and the third optical fibre portion 206 is spaced apart from the first optical fibre portion 202 in the third direction Y, which is perpendicular to the first direction X. Hence, the fibre optical curvature sensor 200 is capable of determining curvature in two perpendicular directions.

In other arrangements, the fibre optic curvature sensor 200 may comprise a fourth optical fibre portion configured similarly to the first, second and third optical fibre portions 202, 204, 206 and spaced apart from the first optical fibre portion 202 in a direction having components in the first and third directions X, Y. The fourth optical fibre portion may have a delay length that is different to the first, second and third optical fibre portions 202, 204, 206. The OPDs of interferences between light reflecting from reflectors in the first and fourth optical fibre portions may be used when determining curvatures in the first and/or third directions.

Alternatively, in other arrangements, the fibre optic curvature sensor 200 may not comprise the third optical fibre portion 206 and may be configured to measure curvatures only in the first direction X.

Furthermore, although in the arrangement depicted, four sets of the reflectors are provided, it will be appreciated that the fibre optic curvature sensor 200 may be extended to include any desirable number of sets of reflectors.

Measurements made using interferometric systems may have a limited unambiguous measurement range corresponding to the range over which the difference in phase between the interfering light varies by $2\pi$ radians. If a measurement being made is known to exceed the unambiguous range of the interferometric measurement device, it may not be possible to rely exclusively on the result of the interferometric measurement, as is not possible to determine a total difference in phase between the interfering light.

In the case of the optical shape sensing system 100, the unambiguous range may correspond to a change in curvature of the curvature sensor 200, e.g. from a neutral, uncurved position of the curvature sensor, that is less than a maximum curvature that it is desirable to measure using the sensor.

During continuous periods of use of the curvature sensor 200, changes in curvature between measurement points, may be within the unambiguous range of the system 100, so that changes in curvature can be accurately determined. However, when the system is initially started, if the curvature of the curvature sensor 200 could be greater than the unambiguous range of the system 100, the initial curvature of the curvature sensor 200 cannot be reliably determined.

In the arrangement depicted in FIG. 2, first and second lasers 112a, 112b are provided. The first and second lasers 112a, 112b may be configured to provide light of different wavelengths. Additionally, the first and second lasers 112a, 112b may be operated, e.g. by the controller 118, such that light from each of the lasers can be distinguished from one another within the interferometric signal received by the detector 114. For example, the light from the lasers may be multiplexed using the signal multiplexing technique or another signal multiplexing technique.

The lasers 112a, 112b may be operated to enable the system 100 to use a two-wavelength interferometry technique. Two-wavelength interferometry techniques can be used to increase the unambiguous range of the interferometry system by combining interferometric signals at different wavelengths. In particular, the unambiguous range may be increased such that the unambiguous range is equal to or greater than the desired operating range of the system 100, e.g. a maximum desirable curvature to be measured using the curvature sensor 200. Hence, using the two lasers enables the initial curvature of the curvature sensor to be determined reliably when the system 100 is initially started.

In other arrangements, the system 100 may comprises three or more lasers and the system may be configured to use a multi-wavelength interferometry technique in a similar way to the two-wavelength interferometry technique. Alternatively, in some arrangements, e.g. if it is only desirable to determine changes in curvature, the second laser 112b may be omitted.

In one application of the optical shape sensing system 100, the fibre optical curvature sensor 200 may be coupled to a surface of or provided within an aerofoil, such as a wing or a propeller or rotor blade for an aircraft. The optical shape sensing system 100 may be used to measure the shape and changes in shape of the aerofoil during testing of the aerofoil and/or operation of the aircraft.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

The invention claimed is:

1. An optical shape sensing method comprising the steps of:
providing first and second optical fibre portions arranged to receive light from at least one common lasers such that a path length of the light from the laser to the first optical fibre portion differs from a path length of the light from the lasers to the second optical fibre portion by a first distance;
wherein the first and second optical fibre portions are spaced apart from each other in a first direction; and
wherein the first and second optical fibre portions comprise a plurality of reflectors spaced along the length of the optical fibre portions, wherein the reflectors are arranged in sets of reflectors, each set including one reflector from each of the optical fibre portions, wherein the reflectors in each set are aligned with one another in a second direction that is perpendicular to the first direction when the optical fibre portions are in neutral positions;
supplying light from the laser to the optical fibre portions;
detecting an interferometric signal from the optical fibre portions at a common detector;
determining, for each set of reflectors, optical path length differences between the reflectors in the set of reflectors based on the detected interferometric signal; and
determining a curvature of the optical fibre portions in the first direction based on the optical path length differences, between the reflectors in the first and second optical fibre portions, for the sets of reflectors.

2. The optical shape sensing method of claim 1, wherein the method further comprises the steps of:
providing a third optical fibre portion arranged to receive light from the at least one common laser such that a path length of the light from the laser to the third optical fibre portion differs from the path length of the light from the laser to the first optical fibre portion by a second distance;
wherein the third optical fibre portion is spaced apart from the first optical fibre portion in a third direction with a component perpendicular to the first and second directions; and
wherein the third optical fibre portion comprises a plurality of reflectors spaced along the third optical fibre portion, wherein the reflectors of the third optical fibre portion are provided within the sets of reflectors such that the reflectors in each set are aligned in the second direction when the fibres are in a neutral position; and
determining a curvature of the optical fibre portions in the third direction based on the optical path length differences, between the reflectors in the first and third optical fibre portions, for the sets of reflectors.

3. The optical shape sensing method of claim 2, wherein the method further comprises the step of determining the curvature of the optical fibre portions in the first and/or third direction based on the optical path length differences, between the reflectors in the second and third optical fibre portions, for the sets of reflectors.

4. The optical shape sensing method of claim 1, wherein the method further comprises the step of modulating the light from the at least one laser using an optical frequency modulation technique, wherein the optical path length differences are determined by applying a range-resolved interferometry technique.

5. The optical shape sensing method of claim 1, wherein the method further comprises the step of applying a signal multiplexing technique to the light from the at least one laser, such that portions of the interferometric signal corresponding to the different sets of reflectors can be distinguished from one another based on a propagation time of the light.

6. The optical shape sensing method of claim 1, wherein two or more common lasers are provided, wherein the method further comprises the steps of:
multiplexing the light provided by the lasers using a signal multiplexing technique such that light from the lasers can be distinguished from one another within the interferometric signals; and
determining the optical path length differences using a multi-wavelength interferometry technique.

7. The optical shape sensing method of claim 1, wherein the optical fibre portions comprise individual optical fibres.

8. The optical shape sensing method of claim 1, wherein the optical fibre portions comprise cores provided within a multi-core optical fibre.

9. An optical shape sensor comprising first and second optical fibre portions arranged to receive light from at least one common laser wherein:
the first and second optical fibre portions are arranged such that a path length of the light from the laser to the first optical fibre portion differs from a path length of the light from the laser to the second optical fibre portion by a first distance;
the first and second optical fibre portions are spaced apart from each other in a first direction; and
the first and second optical fibre portions each comprise a plurality of reflectors spaced along the length of the optical fibre portions, wherein the reflectors are arranged in sets of reflectors, each set including one reflector from each of the optical fibre portions, wherein the reflectors in each set are aligned with one another in a second direction that is perpendicular to the first direction when the optical fibre portions are in a neutral position, and further wherein either:
(1) the reflectors are spaced apart along the optical fibres by a distance greater than the first length; or
(2) the sensor further comprises: a third optical fibre portion arranged to receive light from the at least one common laser such that a path length of the light from the laser to the third optical fibre portion differs from the path length of the light from the laser to the first optical fibre portion by a second distance; wherein the third optical fibre portion is spaced apart from the first optical fibre portion in a third direction that is perpendicular to the first and second directions; and the third optical fibre portion comprises a plurality of reflectors spaced along the third optical fibre portion, wherein the reflectors of the third optical fibre portion are provided within the sets of reflectors such that the reflectors in each set are aligned in the second direction when the fibres are in a neutral position; or
(3) the system further comprises a controller comprising one or more modules configured to: (a) operate the laser to supply light to the optical fibre portions; (b) determine, for the sets of reflectors, optical path length differences between the reflectors in the set of reflectors based on a detected interferometric signal from the optical shape sensor; and (c) determine a curvature of the optical fibre portions based on the optical path length differences, between the reflectors, in each set of reflectors.

10. The optical shape sensor according to claim 9, wherein the reflectors are spaced apart along the optical fibres by a distance greater than the first length.

11. The optical shape sensor according to claim 9, wherein the sensor further comprises: a third optical fibre portion arranged to receive light from the at least one common laser such that a path length of the light from the laser to the third optical fibre portion differs from the path length of the light from the laser to the first optical fibre portion by a second distance; wherein the third optical fibre portion is spaced apart from the first optical fibre portion in a third direction that is perpendicular to the first and second directions; and wherein the third optical fibre portion comprises a plurality of reflectors spaced along the third optical fibre portion, wherein the reflectors of the third optical fibre portion are provided within the sets of reflectors such that the reflectors in each set are aligned in the second direction when the fibres are in a neutral position.

12. The optical shape sensor according to claim 11, wherein the reflectors are spaced apart along the optical fibres by a distance that is greater than the first distance and the second distance.

13. The optical shape sensing system according to claim 9, wherein the system further comprises an optical fibre configured to carry the light from the laser to the optical shape sensor.

14. The optical shape sensing system according to claim 9, wherein the system further comprises an interferometric detector arranged to receive an interferometric signal from the optical fibre portions.

15. The optical shape sensing system according to claim 14, wherein the system further comprises an optical fibre configured to carry the light from the optical shape sensor to the interferometric detector.

16. The optical shape sensing system according to claim 9, wherein the system further comprises a controller comprising one or more modules configured to: (a) operate the laser to supply light to the optical fibre portions; (b) determine, for the sets of reflectors, optical path length differences between the reflectors in the set of reflectors based on a detected interferometric signal from the optical shape sensor; and (c) determine a curvature of the optical fibre portions based on the optical path length differences, between the reflectors, in each set of reflectors.

* * * * *